United States Patent Office 3,464,315
Patented Sept. 2, 1969

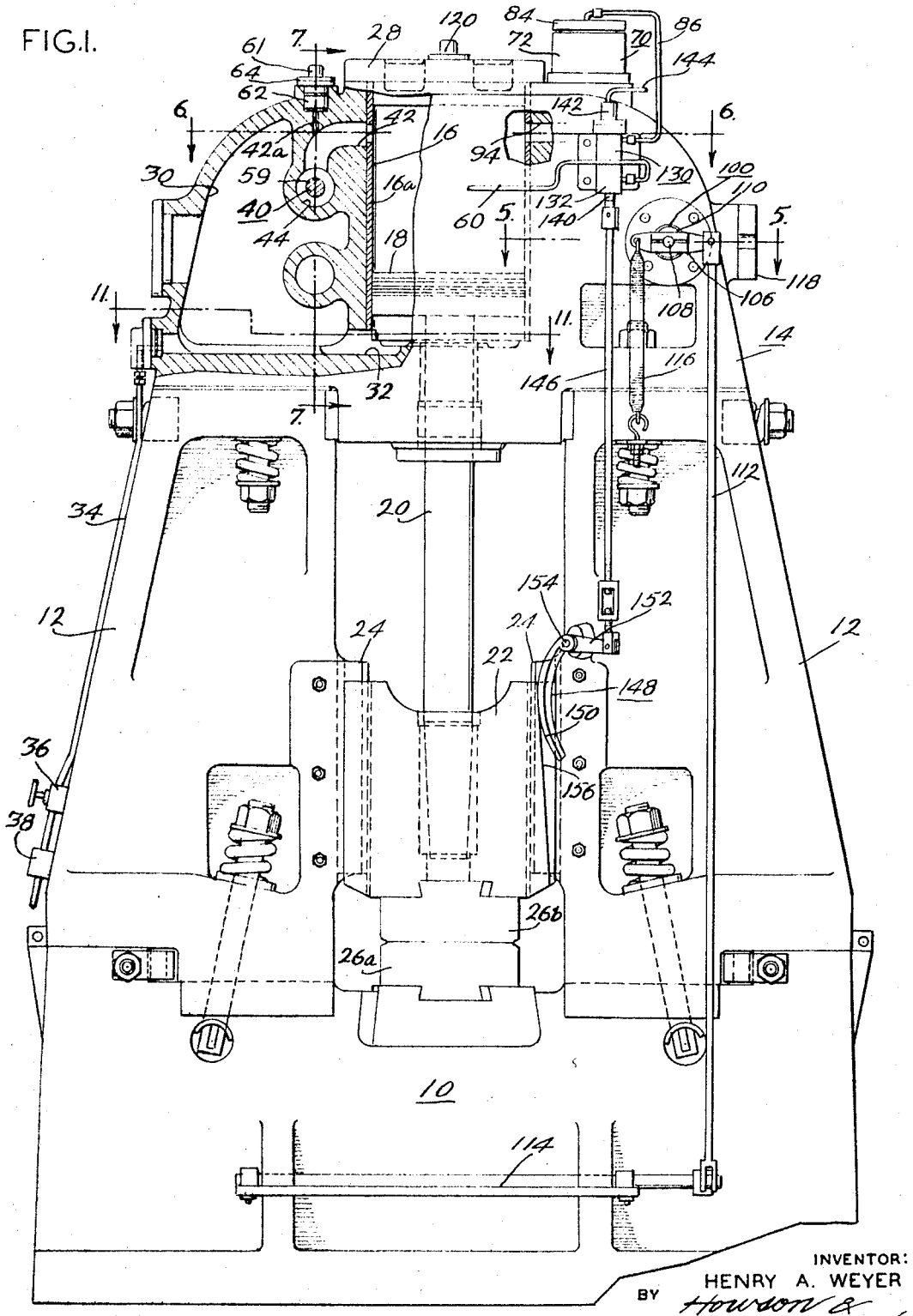

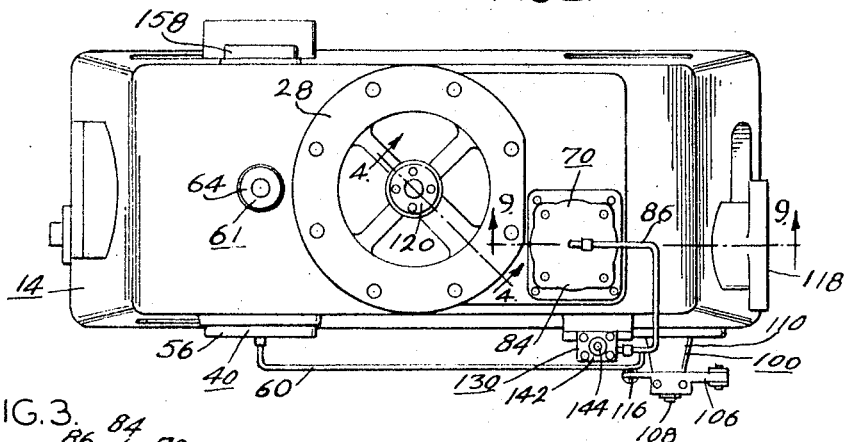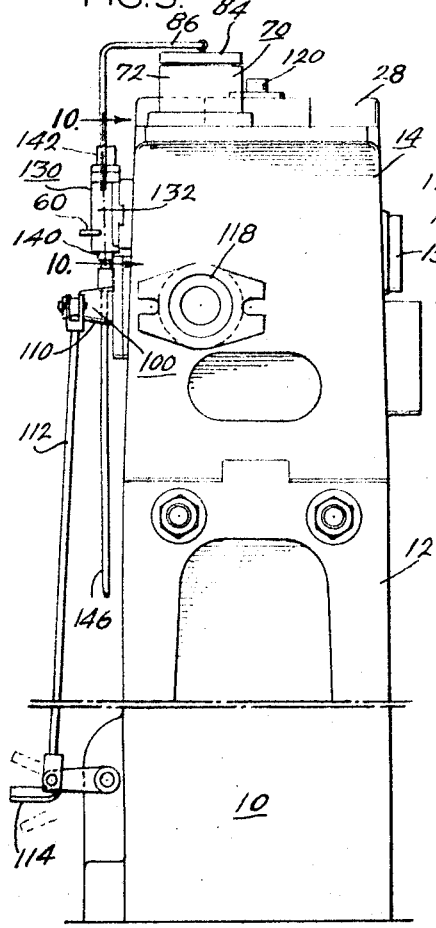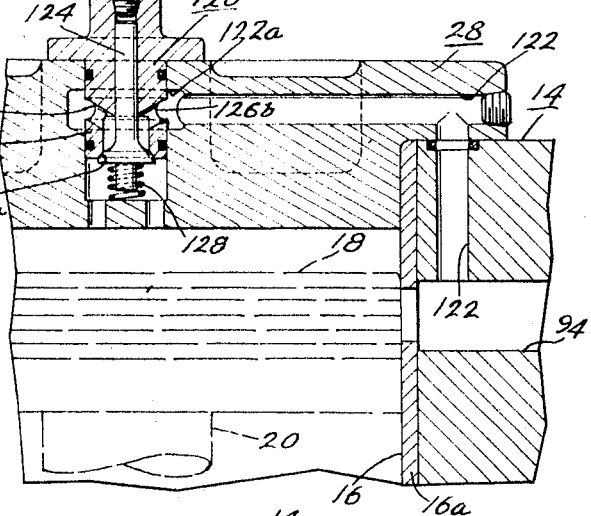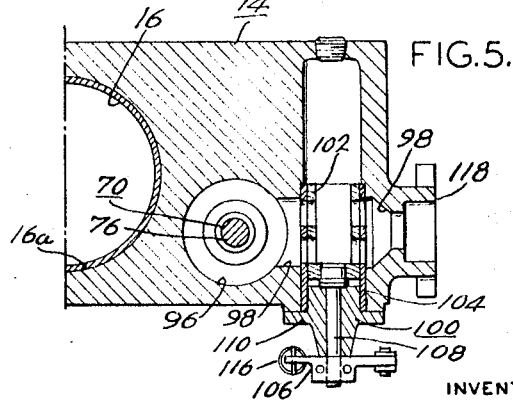

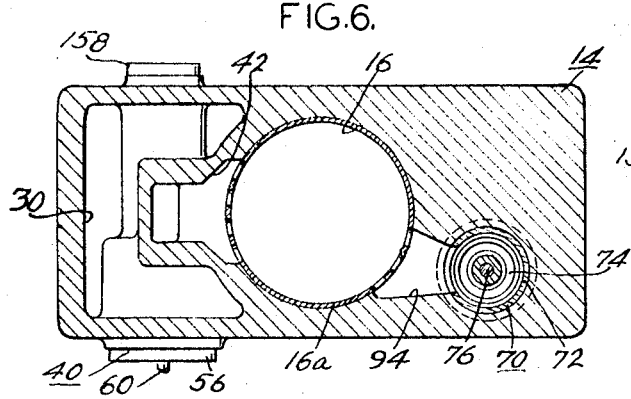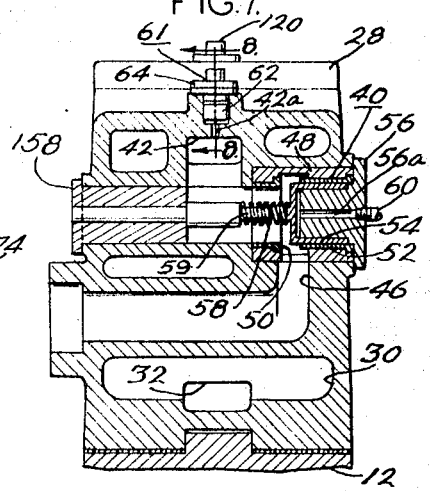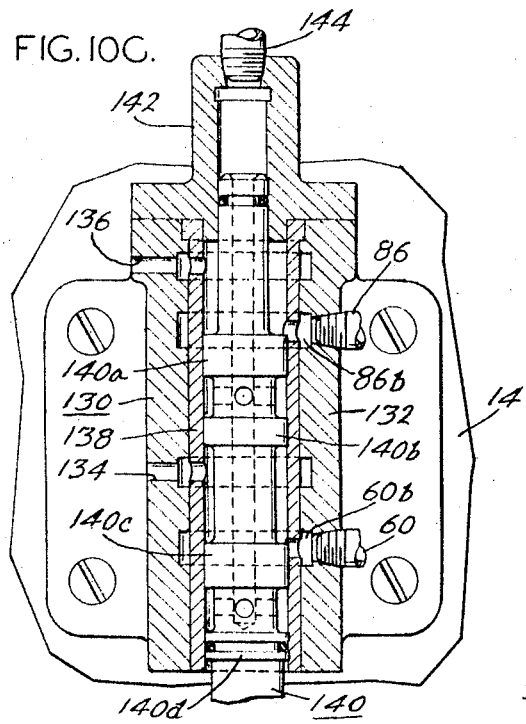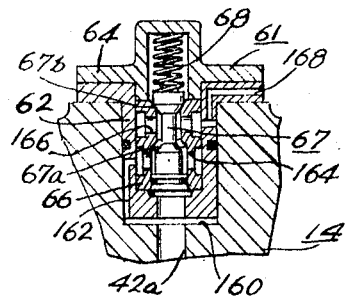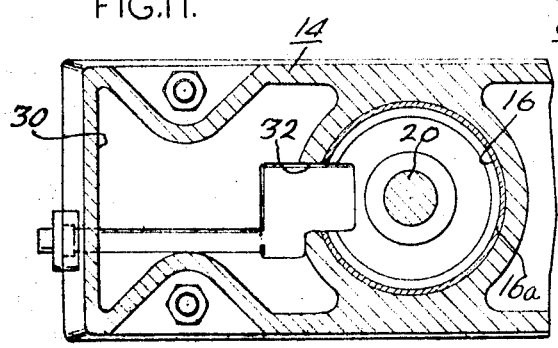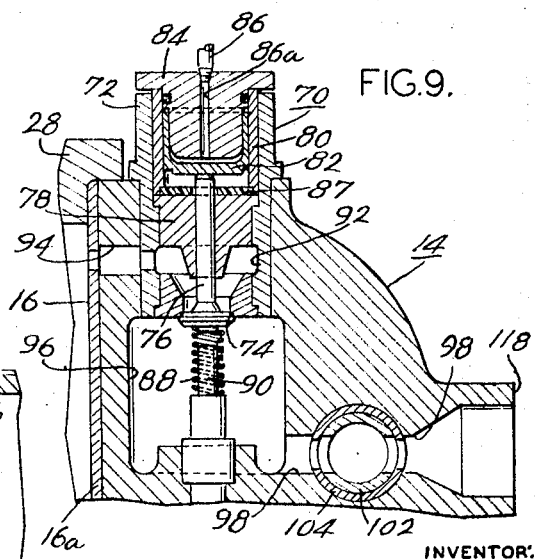

3,464,315
MECHANICAL PNEUMATIC SERVO CONTROL SYSTEM FOR HIGH-SPEED IMPACT DEVICES
Henry A. Weyer, Chambersburg, Pa., assignor to Chambersburg Engineering Company, Chambersburg, Pa.
Filed June 12, 1967, Ser. No. 645,127
Int. Cl. F01b 25/02; F01l 25/02, 15/16
U.S. Cl. 91—165
15 Claims

ABSTRACT OF THE DISCLOSURE

In a pneumatic driven impact device a pilot valve controls the operating air supply inlet and exhaust valves to a cylinder to drive a piston impelling the ram into impact. Ram position determines the position of the pilot valve, and therefore the sequence of valve operation. A manually controlled throttle valve is used to actuate and control the ram by controlling the air supply to the inlet valve. Preferably a regulated pressure supply of air is provided to the cylinder on the opposite side of the ram from the operating pressure supply to withdraw the ram from impact when operating air is exhausted. Preferably the exhaust ducting associated with the exhaust valve has a sufficient surface area in common with a reservoir in which the regulated pressure air is stored to provide a heat transfer surface which employs heat generated in the surging flow of the reused regulated pressure air to warm the exhaust and prevent freezing of the exhaust valve.

---

The present invention relates to mechanical and pneumatic servo control for a high-speed pneumatic impact device. More specifically, the use of a pilot valve and pneumatically controlled inlet and exhaust valves in accordance with the present structure makes high-speed possible and practical in such an impactor.

In the prior art pneumatically actuated impactors have commonly employed cam operated valves and manually controlled spool or flat type main operating valves. Such systems are slow in operating for two principal reasons. By their very nature, the valves, being cam operated, require time to operate. Also the effort required to operate them is relatively great because of their size and mass, and often because of the necessity of using valve gearing.

The use of quick acting poppet valves, or other rapidly responding valves, for inlet and exhaust valves makes it possible for the system of the present invention to be more rapidly responsive to operating conditions, thereby providing rapidly repetitive blows of a selected intensity. The sequence is determined by a pilot valve whose condition is determined by and is dependent upon ram position. The operation is initiated by a throttle valve which may be small and takes relatively small amounts of effort to move. The throttle valve can be operated by a foot pedal so as to leave the hands entirely free to work. Operation requires such small amounts of force that the worker is not unbalanced, in any respect. Furthermore, the worker does not tire from repeated actuation of the manual actuator since the ram will continue to operate repetitively once the manual actuator is actuated.

In accordance with the present invention a control system for a pneumatically driven impact device has a movable ram connected to and driven by a piston in a cylinder. Air is supplied, at a regulated pressure by pneumatic supply means, to the cylinder on the under side of the piston producing withdrawal of the ram from the impact position. Pneumatic supply means capable of supplying air at higher pressure to the cylinder on the upper side of the piston producing drive of the ram includes a pneumatically operated inlet valve and a manually operated throttle valve. The air is exhausted from the cylinder on the inlet valve side of the piston through an exhaust valve, which is also pneumatically operated. A pilot valve has a pneumatic pilot supply of air and connections to the inlet and exhaust valves to selectively operate those valves. The pilot valve is positioned by means associated with the ram to selectively actuate the inlet and exhaust valves in a predetermined sequence.

The structure thus described permits a ram, which is pneumatically actuated to deliver highly precise, constant, repetitive blows at a high rate of speed. By "pneumatic" is meant a compressible gaseous medium, ordinarily air, but possibly other gaseous materials. The throttle valve controls the intensity of the blow and this intensity may be selected and regulated by the selected position of this valve, which is the only manually operated valve in the system. Preferably, manual operation is through a foot so that the hands are left free to feed the hammer. The amount of effort required to operate the throttle valve is minimal and the operating mechanism may be designed so that it leaves the operator's hands free to feed the impact device without throwing him off balance. As previously mentioned repetitive blows do not require repetitive manual operation but once the mechanism is operated the blows will continue repetitively until the mechanism is released.

For a better understanding of the present invention reference is made to the accompanying drawings in which FIG. 1 is a front elevational view showing a high speed forging hammer employing the control system of the present invention, with part of the structure broken away to show the nature of the control system;

FIG. 2 is a plan view from above the forging hammer of FIG. 1;

FIG. 3 is a side elevational view of the hammer foreshortened by excluding a portion of the impact area;

FIG. 4 is a sectional view taken along line 4—4 of FIG. 2;

FIG. 5 is a sectional view taken along line 5—5 of FIG. 1;

FIG. 6 is a sectional view taken along line 6—6 of FIG. 1;

FIG. 7 is a sectional view taken along line 7—7 of FIG. 1;

FIG. 8 is a sectional view taken along line 8—8 of FIG. 7;

FIG. 9 is a sectional view taken along line 9—9 of FIG 2;

FIG. 10C is a sectional view taken along line 10—10 of FIG. 3;

FIG. 11 is a sectional view taken along line 11—11 of FIG. 1; and

Figure 10A:
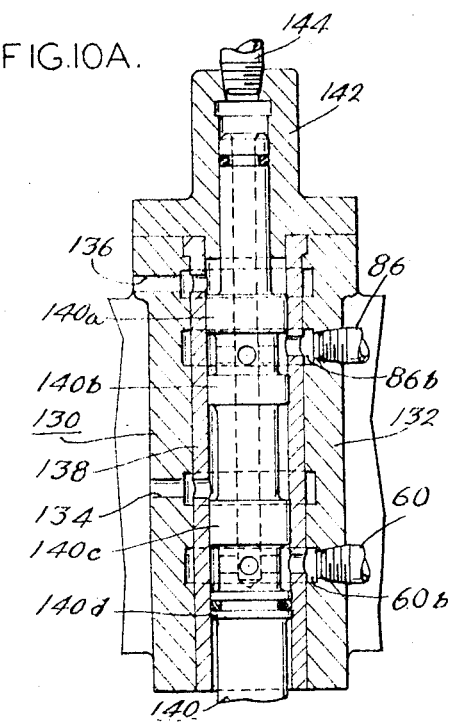
FIGS. 10A, 10B, 10D and 10E are sectional views similar to the pilot valve structure of FIG. 10C, but showing the valve in different positions.

Referring first to FIGS. 1, 2 and 3, the structure shown is a high speed forging hammer for flat die work and impression die work controlled by a mechanical-pneumatic servo control system of the present invention. In FIGS. 1 through 3 the major parts of the frame of the forging hammer may be seen to be the anvil 10, a pair of upright frame members 12 and a yoke 14. These parts are bolted together in conventional fashion for a machine of this type to accommodate heavy impact and vibration forces. The anvil 10 and the frame members 12 are of generally standard cast construction, but the yoke is considerably modified over the conventional yoke used in machines of this general type.

The yoke 14 is designed to be hollow and provides a number of cavities, the functions of which will be explained hereafter. The largest cavity is centrally located cylinder 16 which is generally of right circular cylindrical form with a vertically oriented axis. In the cylinder is located a piston 18 which is moved up and down within the cylinder by the introduction of air under pressure. Air is introduced and removed from the cylinder through ports in its walls. The piston 18 is connected by piston rod 20 to a ram 22. The piston rod 20 passes through suitably gasketed bushings to prevent leakage of air from the cylinder along the piston rod. The ram is always in contact with and guided by guide pieces 24 which are bolted onto the frame 12, four of which are preferably used in order to assure the same ram positioning at impact blow after blow. The anvil 10 and the ram 22, respectively, carry forging dies 26a and 26b between which is fed metal stock to be forged in a conventional manner. The piston 18 is provided with suitable piston rings which effectively prevent the flow around the edges of the piston between it and the cylinder walls of any substantial amount of air. The cylinder itself has a replaceable cylinder liner 16a providing a uniform cylinder wall and wear surface for cooperation with the piston 18. The top of the cylinder is closed by suitable cylinder head 28 preferably bolted to the yoke 14, as best shown in FIG. 2.

Reservoir 30 communicates with the cylinder 16 through duct 32 as seen in FIGS. 1 and 7. Thus communication is through the bottom of the cylinder 16, on the side of the piston which causes the ram 22 to be withdrawn from impact position. Air under pressure is fed into reservoir 30 through line 34 when valve 36 is open. Pressure is regulated by pressure regulating valve 38 which admits air only when the pressure drops below a predetermined value. Since there is relatively little leakage from the piston and ram return air pressure system, very little air needs to be added because the air in the reservoir is available to be used and reused. As greater air pressure on the other side of piston 18 urges the piston downward driving the ram 22 to impact, air is forced out the bottom of the cylinder 16 through the duct 32 and into reservoir 30 and in this process it is compressed. Then when air is exhausted from the cylinder above the piston the pressure of the air in reservoir 30 drives the piston 18 back upwardly.

Upward movement of the piston is permitted by evacuation of the cylinder above the piston through the exhaust system, including exhaust valve 40, best seen in FIG. 7. Air above the piston leaves the cylinder 16 by flowing laterally through duct 42 as seen in FIG. 1. Duct 42 has a downward bend into a cross-channel 44 which contains the valve 40 and flow proceeds thence, as best seen in FIG. 7, downward and laterally through L-shaped channel 46 which is open to the atmosphere.

Exhaust valve assembly 40 consists of a valve housing 48, a valve seat 50, valve guide 52, poppet valve 54 and cover 56. The valve housing 48 is sealed in the yoke structure 14 by an O-ring. Poppet valve 54 is held in the normally open position away from the valve seat 50 by spring 58, which is in turn held in position by retainer 59. In this case the retainer whose end also provides a stop is a narrow diameter portion of a larger pin supported from sleeve 158, which is inserted in the structure of yoke 14. The helical spring 58 extends between the shoulder between the larger and smaller diameters and the bottom of the cup-like poppet valve 54. A boss on the bottom of poppet valve 54 preferably engages and holds the spring in place. Air pressure to operate the exhaust valve is supplied from the pilot valve through bore 56a by way of tubing 60.

Expanding exhaust air escaping from the cylinder when the exhaust valve is open tends to materially reduce in temperature providing a refrigerating effect. This may be sufficiently great to cause ice to form on the valve and impair its operation. This effect may be exaggerated in a machine running at relatively high speed as the machine of the present invention is expected to do. The moisture in the exhaust air at freezing temperature then tends to build up frost and ice on the exhaust valve components and impairs the correct functioning of the exhaust valve.

It will be observed that the arrangement of the exhaust system from the cylinder 16 is such that the exhaust air ducting has sidewalls with large areas effectively in contact with the reservoir 30 to provide large heat exchange areas and in fact, to the end the exhaust ducting is made larger than necessary and made to flow through the reservoir. As a consequence in accordance with the present invention the temperature of the exhaust valve is maintained sufficiently high to avoid the tendency for the exhaust valve to freeze.

The constant air pressure of the reservoir is selected to be just slightly greater than is necessary to raise the piston and its supported ram when greater air pressure above the piston used to force the ram downward is exhausted. When that happens the air pressure in the reservoir is able to return from the reservoir to the cylinder below the piston through passage 32. The piston moves upwardly under the pressure of the air from the reservoir. In the course of this process the pressure of the air in the reservoir decreases to the precharged level. Due to the changes in pressure in the reservoir as the piston moves alternately down and up there will be a corresponding increase and decrease in reservoir pressures. There will also be some fluctuation in air temperature, but this will be relatively insignificant effect. However, the frictional effect of air passing through the air passage 32 will elevate the temperature of the trapped air considerably. It is this effect in accordance with the present invention that generates the heat used to raise the temperature of the exhaust valve in opposition to the cooling effect of the expanding exhaust air.

A poppet relief valve 61 is provided in the duct 42 to prevent even a small amount of build-up of air pressure which can be caused by leakage of air under pressure from reservoir 30 through piston ring clearances in piston 18 to cylinder space 16 above piston 18. As best seen in FIG. 8, the poppet relief valve 61 is preferably a self-operated, two-way poppet valve consisting of a sleeve 62, a cover or cap 64, a spool 66 having three radial flanges and two radial ports 164 and 166 and an interconnecting axial duct through the spool and a movable poppet spindle 67 within the spool. Spindle 67 has a stem interconnecting two piston areas 67a and 67b. Piston 67b normally rests against upper shoulder of spool 66 where it is held by the action of spring 68.

Air in cylinder space 16 above piston 18 due to leakage can freely escape through duct 42 and 42a, space 160, port 162, port hole 164, the passage formed by spindle 67 and spool 66 when spindle is in the normally open position as shown in FIG. 8, port hole 166, and passage 168 to atmosphere. Therefore, a pressure build-up is impossible when the valve is in the position of FIG. 8.

When operating air pressure is charged from inlet valve 70 to cylinder space 16 above piston 18, the pressure against the lower piston area of spindle 67 will overcome the light pressure of spring 68 and will press spindle area 67a against spool 66. In this position of spindle 67 relief valve 61 is closed.

The inlet valve to the cylinder 16 is generally designated 70 and protrudes above the yoke 14, as seen in FIG. 1. As best seen in FIG. 9, the poppet valve 70 is provided with a valve housing 72 fixed in the yoke structure 14. On this housing 72 is provided a valve seat 74 for valve stem 76 and a valve guide 78 for the stem. A tubular poppet valve guide 80 is also provided within housing 72 to support the cup-like poppet valve 82. Atop poppet valve 82 is the poppet valve cover 84, through which passes a passage 86a at the end of pilot air feed line 86 for supplying operating air to operate the poppet valve. A cushion 87 of fabric material, or the like, on a shoulder beneath the poppet valve softens the blow for the poppet valve as air pressure urges it downwardly and against the end of the stem 76 to urge the valve stem away from its valve seat 74. The valve stem 76 is normally held against the valve seat 74 by helical spring 88 on a retainer 90 similar to the one holding the poppet valve spring for the exhaust valve. Retainer also provides a stop for the valve stem 76. The inlet valve, it will be observed, is held in normally closed position as opposed to the normally open position of the exhaust valve. A charge of air pressure through supply line 86 will urge poppet valve 82 against valve stem 76 opening the valve stem from the valve seat 74 against the urging of spring 88. As seen in FIGS. 9 and 6, the upper chamber 92 of inlet valve is connected to the cylinder 16 by passage 94. The inlet chamber 96 of the inlet valve as seen in FIG. 9 is fed from a lateral passage 98 along which the throttle valve generally designated 100, is located (see FIG. 5).

As seen in FIG. 5 the throttle valve preferably consists of a valve body 102 which cooperates in a renewable close fitted seat 104. Valve body 102 is rotatable about its horizontal longitudinal axis by means of a lever 106 connected to stem 108, which is positioned by cover 110 which provides a long bearing. The throttle valve, as its name implies, offers a means of gradually opening an aperture, permitting an increasing volume of flow as the valve is turned clockwise about its axis. Lever 106 is pivotally connected to the rod actuator 112 which, in turn, is connected to a foot treadle 114 pivoted on the anvil of base portion 10, providing leverage as seen in FIG. 3. Lever 106 is connected on its other end to a spring 116 which is anchored at its other end to the frame. Spring 116 tends to urge the throttle into closed position.

Operating air pressure for the piston of sufficient pressure to overcome the regulated air pressure in reservoir 30 is connected to the system of the throttle and inlet valves above described by means of inlet 118. From the inlet operating air passes through passage 98 through the throttle valve 100 and through inlet valve 70, and via passage 94 into the upper portion of the cylinder 16.

Auxiliary valve 120 in the cylinder cover 28, as seen in FIGS. 2 and 4 serves the purpose of permitting operation when the piston 18 rises above the level of the normal inlet 94 to cylinder 16. When this occurs air is diverted through an L-shaped passage 122 which has a vertical portion extending upwardly through the yoke 14 and into the cover 28 where it intersects a horizontal portion. This passage merely carries air from the inlet valve 70, port 94 to the auxiliary operating valve 120. The auxiliary operating valve 120 consists of a valve stem 124 which normally is closed against the seat 126a of valve guide 126 due to the urging of spring 128 to normally close off the passage 122 and the inlet chamber 122a from the cylinder 16. When the piston 18 blocks entry of operating air directly into cylinder 16 the air is able to flow through passage 122 and its pressure through passage 126b in valve guide 126 will open the valve stem 124 against the action of spring 128 and allow pressure into the cylinder 16 above the piston 18. Once the piston has descended to the level of passage 94, greater pressure due to larger area at the bottom of the valve stem 124, assisted by spring pressure of spring 128, will close the valve.

Control of the sequence or programming of the operation is determined by the five-way spool type pilot valve 130 shown in detail in FIG. 10C. The various operating positions of the pilot valve are seen in FIGS. 10A, 10B, 10C, 10D and 10E. This pilot valve preferably consists of a housing 132 which may be mounted on the yoke structure 14 by suitable brackets. Into ports 60b and 86b in the housing 132 are connected exhaust valve operating line 62 and inlet valve operating line 86, through which air for actuating the exhaust and inlet poppet valves is fed. Also, extending through the housing 132 are ports 134 and 136 to atmosphere. In each case the ports and connections are connected to an annular compartment in the housing 132 surrounding and communicating radially with the valve through openings through liner 138. Within the liner 138 is the spool 140, which as shown, has three radially extending blocking flanges 140a, 140b, 140c and a sealing flange 140d. The blocking flanges successively block the respective ports previously described. An axial port runs lengthwise of the spool 140 and is open at its top end but closed at its bottom end. Between the flanges are channels and between the channels intermediate flanges 140a and 140b, and between the channels intermediate flange 140c and sealing flange 140d are lateral ports into the axial port. The top end of spool 140 lies within cap 142 and is connected to supply line 144. In this way, air is provided at a pressure sufficient to actuate the inlet valve 70 and the exhaust valve 40 through their respective supply lines 86 and 60. The air pressure also tends to urge the spool 140 downwardly in a resilient manner similar to a spring, but downward motion is resisted by a mechanical linkage system connected to the bottom of the spool 140. The linkage shown includes a connecting rod 146, as seen in FIG. 1, joined to cam arm 152 of a cam assembly, generally designated 148. A cam follower 150 provides the other arm of the cam assembly. The cam assembly 148 is pivoted on one of the frames 12 about a pivot point 154. A cam track surface 156 on the ram 22 causes the cam follower 150 to assume successive positions representative of the position of the ram and therefore determines pilot valve position as well as crank position.

In particular, the position of the spool 140 in FIG. 10C is representative of the bottom extreme position of the ram shown in FIG. 1, when the ram is in a lowermost position. FIG. 10A shows the spool in its uppermost position and FIG. 10B in an intermediate position during downstroke. FIGS. 10D and 10E are successive spool positions during the upward ram movement.

Starting with FIG. 10A which shows the cam operated pilot valve spool raised to its top position, as the ram reaches its top position, air entering the spool from inlet 144 in this position will flow through the spool and into both the intake and exhaust poppet valve lines 86 and 60 to charge those valves and operate them out of their normal rest position. The inlet valve as a result will be opened, making possible a flow of air to the cylinder 16 if permitted by the throttle valve. The exhaust valve by the same action will be closed. When throttle valve 100 is operated by foot treadle 114 (or automatically in a desired situation) in the process previously described, air from an operating supply will enter through the inlet valve into the chamber 16 above the piston, first through the throttle valve, thence into chamber 96, through inlet valve 70 and directly through the passage 94. Once the inlet valve is held open and the exhaust valve is held closed in the top position of the pilot valve shown in FIG. 10A, the compressed air operating the piston passes freely into the cylinder and drives the ram downward. Moreover, the region above the cylinder will become pressurized and this pressure, plus the falling weight will overcome the constant preset return or holdup pressure beneath the piston so that air below the piston will be compressed and urged back into the reservoir as the ram and the piston descend. The rate of motion or speed depends upon the amount of throttle valve 100 opening, which in turn is dependent upon the amount the foot treadle is depressed. An experienced operator will learn how to achieve blows of varying force by the position in which he places the treadle.

The cam follower 150 is constantly pressed against the ram incline 156 by air pressure against the top of the spool 140 of the pilot valve 130. This keeps pressure on the cam follower through the connecting link 146 keeping the follower 150 against the cam 156. The position of the cam is changed as the ram descends and the cam follower maintains contact with the cam which, in turn, moves the cam arm 152 and the whole cam assembly clockwise. Therefore the spool of the cam operated pilot valve 130 moves downward.

Figure 10B:
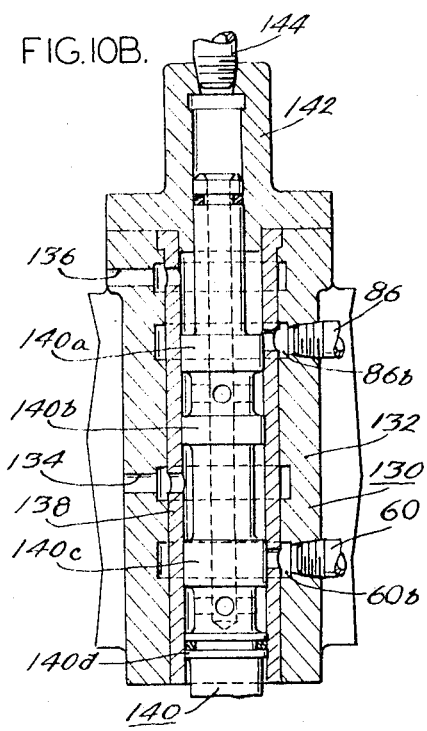
Figure 10D:
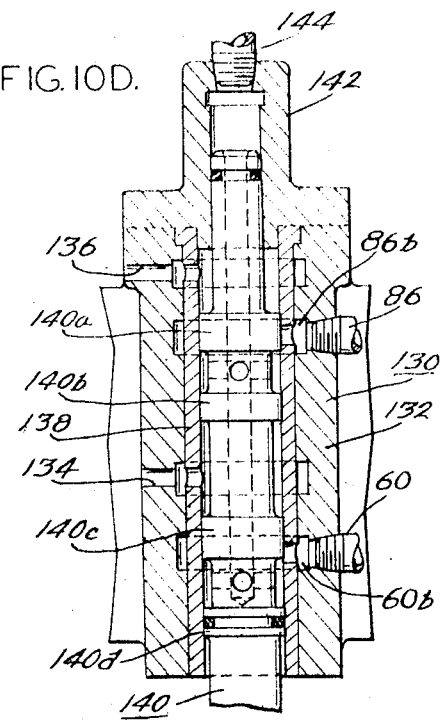
Figure 10E:
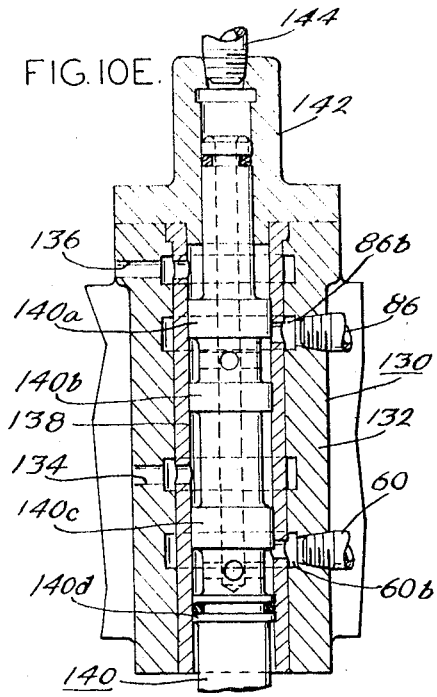

As the ram decends into the lower half of its stroke, the spool 140 of the pilot valve 130 assumes the position of FIG. 10B in which pilot air is exhausted from the inlet poppet 22 to atmosphere through port 136 since the spool 140 is lowered to a point where conduit 86 is connected to port 136. As a consequence, spring 88 will raise valve stem 76 into contact with seat 74 and close the inlet valve (FIG. 9).

The position shown in FIG. 10C is one in which the ram 22 has descended further to the point where the spool 140 of the pilot valve connects the duct 134 to atmosphere through conduit 62. As a consequence the pilot air is exhausted from the exhaust poppet valve 40 (FIG. 7). Thereupon spring 58 raises the poppet valve 54 from seat 50 and thereby opens the cylinder 16 above the piston to atmosphere, as previously described. However, the ram 22 will continue to move downwardly until the dies on the anvil and ram are together and the blow is struck. The spool 140 of pilot valve 130 is also in its lowest position at this time, and in this position the inlet valve remains closed and the exhaust valve remains open. Exhausting the air above the piston to atmosphere will shift the pressure balance in favor of the air in the reservoir 30 and the piston will move up as air flows from the reservoir to the cylinder beneath the piston.

Referring to FIG. 10D, after the ram 22 has moved partly into the upper half of its stroke the spool 140 of plot valve 130 has also risen proportionately. The pilot valve is so positioned that pilot air may pass through the hole between flanges 140c and 140d into the conduit 62 to the exhaust valve. Thus charged, the exhaust valve closes.

Finally, the spool 140 of the pilot valve 130 moves into the position shown in FIG. 10E wherein the ram 22 has risen toward the top of its stroke. Pilot air is now admitted to the inlet valve through line 86 from the port in the spool between flanges 140a and 140b. Poppet valve 70, therefore, opens stem valve 76 and compressed air passes through the inlet valve and into the chamber through passage 94 (FIG. 9). The pressure increases in the cylinder as the piston and ram rise, thus tending to check the upward motion of the piston and ram and forcing it down as soon as balances are struck.

As long as the foot treadle 114 is held depressed, the ram will repeat the cycle of operation described. Variation of the position of the foot treadle will produce variation in the intensity of the blows of the hammer. Single blows may be struck by depressing the foot treadle 114 clear down and releasing it immediately. However, where multiple blows are desired timing repetition of foot motion for each blow is unnecesary.

Th possibility of pressure build-up above the piston 18 is avoided by a poppet relief valve 61 shown and described in connection with FIG. 8. The valve is normally held in the open position by applied pressure of spring 68 to allow escape of pressure build-up caused by leakage around the piston rings of piston 18 in the cylinder 16. The valve is closed as earlier described when pressure from the inlet valve is applied.

Figure 12:
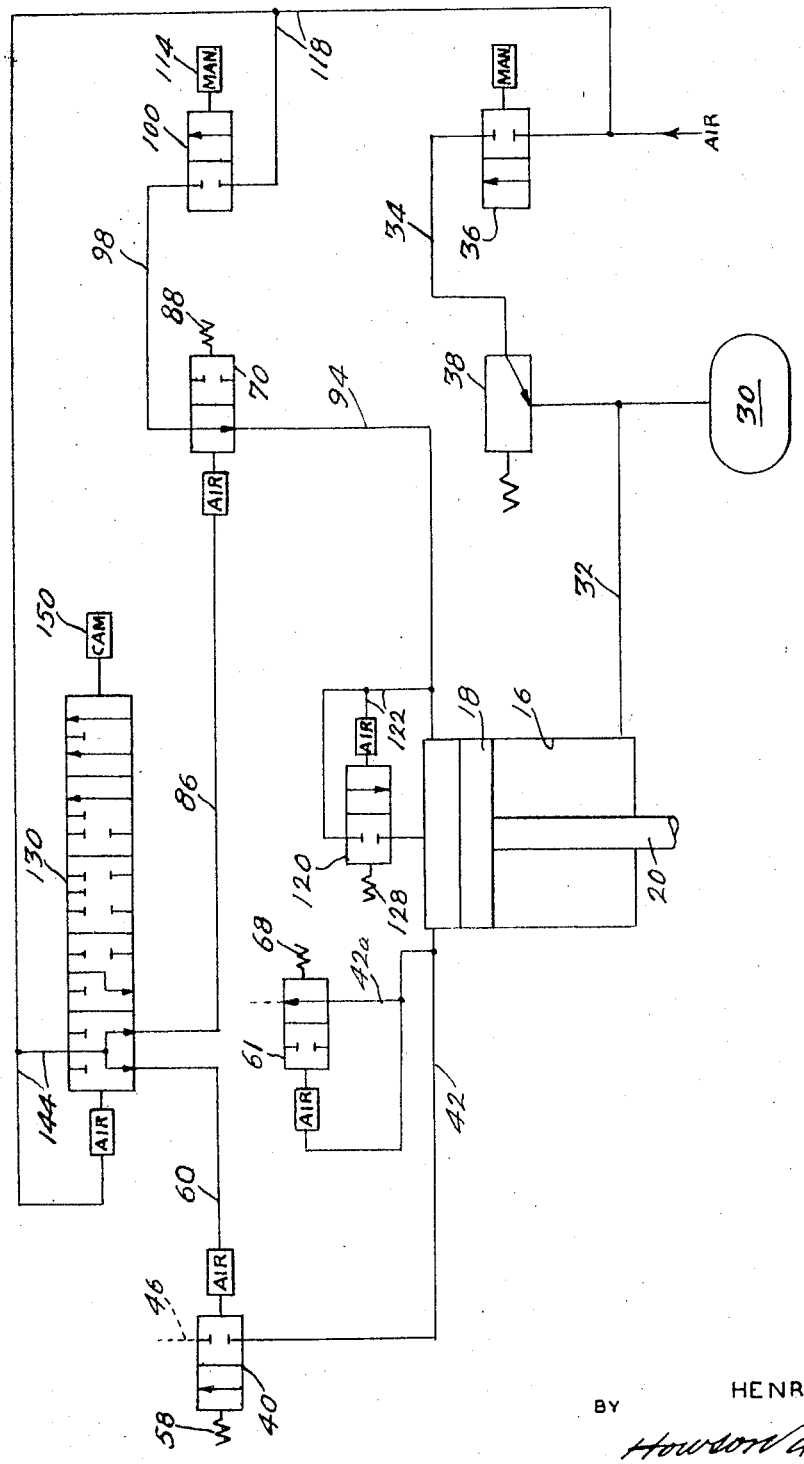
FIG. 12 is a diagrammatic, or schematic view, of the pneumatic circuit of the present invention.

A diagrammatic view showing the operation of the system of the present invention is shown in FIG. 12. This diagram shows schematically the passage 32 from the reservoir 30 to the piston 18 and cylinder 16 whereby the piston is returned to its upper position by air stored in reservoir 30. The air supply to the reservoir is regulated to a minimum predetermined pressure by pressure regulator 38. Exhaust from the upper side of the piston can occur through line 42 and exhaust valve 40 when spring 58 is not overcome by air pressure through line 60. In the position shown air is supplied through line 60 from pilot valve 130 keeping valve 40 closed. Pressure in the same position of the pilot valve is supplied through line 86 to urge inlet valve 70 into its open position against the urging of spring 88. In this open position, provided that throttle valve 100 has been actuated, air flow from the supply through the throttle valve and the inlet valve will drive the piston and ram downwardly. The intensity is regulated by the throttle valve 100. As the piston reaches the upper end of its stroke, auxiliary valve 120 permits the supply of inlet pressure to the cylinder 16 on the upper side of piston 18 and piston 18 begins to moved down and proceed through the sequence explained above.

I claim:
1. A control system for a pneumatically driven impact device having a movable ram connected to and driven by a piston in a cylinder comprising
   pneumatic supply means to supply air at a regulated pressure to the cylinder on the side of the piston producing withdrawal of the ram from impact position,
   pneumatic supply means including a pneumatically operated inlet valve and a manually operated throttle valve capable of supplying air to the cylinder on the side of the piston producing drive of a ram at a sufficient pressure to overcome the force applied to the side of the piston producing ram withdrawal,
   a pneumatically operated exhaust valve connecting to atmosphere the cylinder on the side of the piston producing the drive of the ram, and
   a pilot valve for controlling said inlet and exhaust valves having a pneumatic pilot supply and selective connections to the inlet and exhaust valves positioned by means associated with the ram to actuate selectively the inlet and exhaust valves, said pilot valve being repetitively sequentially positioned into different successive positions representative of ram position to yield a predetermined sequence of at least three combinations of inlet and exhaust valve operating conditions in accordance with various ram positions, each of the provided combinations being maintained effective and unchanged over a predetermined range of ram positions thereby permitting characteristic pneumatic expansion effects to occur while a given combination is maintained.

2. The control system of claim 1 in which the pilot valve is a spool valve having a linkage connection to a cam follower which cooperates with a cam surface on the ram to position the spool of the valve in accordance with ram position.

3. The control system of claim 1 in which the manually operated throttle valve is operated through a linkage accessible to an operator to control initiation of an impact cycle.

4. The control system of claim 3 in which the linkage system terminates in a foot treadle which may be operated by the foot of the operator with little pressure to initiate operation of the impact device.

5. The control system of claim 4 in which the throttle valve treadle may be held pressed against the action of a light spring to hold the throttle valve open at a selected position to control the rate and force of impact and in which the pilot valve is dependent only upon ram position so that cycles of the system at the selected rate and force of impact may be repeated automatically by holding the treadle depressed.

6. A control system in accordance with claim 1 in which the impact device has a frame including a yoke, the cylinder for the piston connected to the movable ram is in the yoke, the inlet and exhaust valves are both provided in the yoke and adjacent to the cylinder with intercommunicating ducts near the top of the cylinder.

7. The control system of claim 6 in which the intake is normally closed and the exhaust is a normally open valve, pneumatic charges from the pilot valve control cause each of them selectively to change state.

8. The control system of claim 7 in which the intake and exhaust valves are both poppet type valves of relatively light construction so as to be quickly effective in response to actuation by pneumatic charges from the pilot valve.

9. The control system of claim 8 in which an overpressure valve is provided in association with the exhaust valve to prevent the build-up of dangerous pressures.

10. The control system of claim 9 in which the overpressure valve is a poppet type relief valve adapted to be rapidly responsive when pressures exceed a predetermined value.

11. The control system of claim 9 in which a poppet type valve is provided in association with the inlet valve in a bypass duct whereby when the piston rises sufficiently high in the cylinder as to pass the inlet port, inlet air under pressure may bypass the port and enter through the poppet type valve which permits entry of air under pressure to cause the ram to start on its downward movement.

12. The control system of claim 1 in which the means to supply air at a regulated pressure to the cylinder on the side of the piston producing withdrawal of the ram from impact position includes a reservoir into which air can flow during the impact portion of the cycle, said reservoir being sufficiently large to accommodate the compression of air resulting from the forcing of the air out of the cylinder into the reservoir.

13. In a pneumatic impactor comprising
a ram connected to and driven by a piston in a cylinder,
pneumatic supply means to supply air at a regulated pressure to the cylinder on the side of the piston producing withdrawal of the ram from impact position,
pneumatic supply means capable of supplying air to the cylinder on the side of the piston producing drive of the ram at a sufficient pressure to overcome the force applied to the side of the piston producing ram withdrawal,
an exhaust conduit including an exhaust valve connected to the cylinder on the side of the piston producing drive and a pneumatic supply reservoir connected to the cylinder on the side of the piston producing withdrawal, The improvement consisting of making the passage from the reservoir to the cylinder sufficiently small that the air is heated as it passes back and forth between cylinder and reservoir and arranging the exhaust conduit adjacent the reservoir so that walls of the exhaust conduit are in heat exchange relationship with the reservoir.

14. The impactor construction of claim 13 in which the exhaust ductwork at least in part passes through the reservoir so as to expose a major portion of its area to the heated air in the reservoir.

15. The control system of claim 12 in which the passage from the reservoir to the cylinder is made sufficiently small that the air is heated as it passes back and forth from reservoir to cylinder and the exhaust conduit passes in part at least through the reservoir so that the walls of the exhaust conduit are in heat exchange relationship with the reservoir.

References Cited

UNITED STATES PATENTS

| | | | |
|---|---|---|---|
| 371,076 | 10/1887 | Knight | 91—314 |
| 1,067,613 | 7/1913 | Lane | 91—271 |
| 2,099,368 | 11/1937 | Levy | 92—134 |
| 2,247,802 | 7/1941 | Damerell | 92—144 |
| 2,267,177 | 12/1941 | Twyman | 91—314 |
| 2,699,154 | 1/1955 | Smith | 91—314 |
| 3,296,938 | 1/1967 | Hayman | 91—271 |

PAUL E. MASLOUSKY, Primary Examiner

U.S. Cl. X.R.

91—239, 240, 244, 268, 271, 308, 321